United States Patent
Choisnet

(10) Patent No.: US 8,261,610 B2
(45) Date of Patent: Sep. 11, 2012

(54) AERODYNAMIC MEASUREMENT PROBE OF AN AIRSTREAM ALONG A WALL

(75) Inventor: Joël Choisnet, Naveil (FR)

(73) Assignee: Joel Choisnet, Thales, Neuilly-sur-Seine (FR)

( * ) Notice: Subject to any disclaimer, the term of this patent is extended or adjusted under 35 U.S.C. 154(b) by 329 days.

(21) Appl. No.: 12/644,229

(22) Filed: Dec. 22, 2009

(65) Prior Publication Data

US 2010/0186497 A1    Jul. 29, 2010

(30) Foreign Application Priority Data

Dec. 23, 2008   (FR) ...................................... 08 07392

(51) Int. Cl.
*G01P 5/00* (2006.01)
(52) U.S. Cl. .................................................... 73/170.13
(58) Field of Classification Search ... 73/170.01–170.13
See application file for complete search history.

(56) References Cited

U.S. PATENT DOCUMENTS

| | | | | |
|---|---|---|---|---|
| 4,031,756 A | * | 6/1977 | Rotier et al. ............... | 73/170.02 |
| 4,038,870 A | * | 8/1977 | Rotier .............................. | 73/181 |
| 4,112,756 A | | 9/1978 | MacLennan et al. | |
| 4,143,548 A | | 3/1979 | Graewe et al. | |
| 4,890,488 A | | 1/1990 | Pincent et al. | |
| 5,585,557 A | * | 12/1996 | Loschke et al. ............ | 73/170.14 |
| 7,155,969 B2 | | 1/2007 | Drutowski et al. | |
| 7,490,510 B2 | * | 2/2009 | Agami et al. ............... | 73/170.02 |
| 2005/0131591 A1 | * | 6/2005 | Drutowski et al. ................ | 701/3 |
| 2007/0084286 A1 | * | 4/2007 | Ajay et al. ....................... | 73/597 |

FOREIGN PATENT DOCUMENTS

DE   35 06 591 A1   8/1986

* cited by examiner

*Primary Examiner* — Andre Allen

(74) *Attorney, Agent, or Firm* — Baker & Hostetler LLP

(57) ABSTRACT

The invention relates to an aerodynamic measurement probe of an airstream along a wall. The invention makes it possible notably to determine the attack of an airstream relative to an axial reference tangential to the wall. The invention is particularly useful in the aeronautical field. According to the invention, the probe comprises several emitters that can each emit a sound wave and a receiver sensitive to the different sound waves. Thus, there is forewarning of the receiver error that is common to all the measurements of travel time of a sound wave between one of the emitters and the receiver.

13 Claims, 2 Drawing Sheets

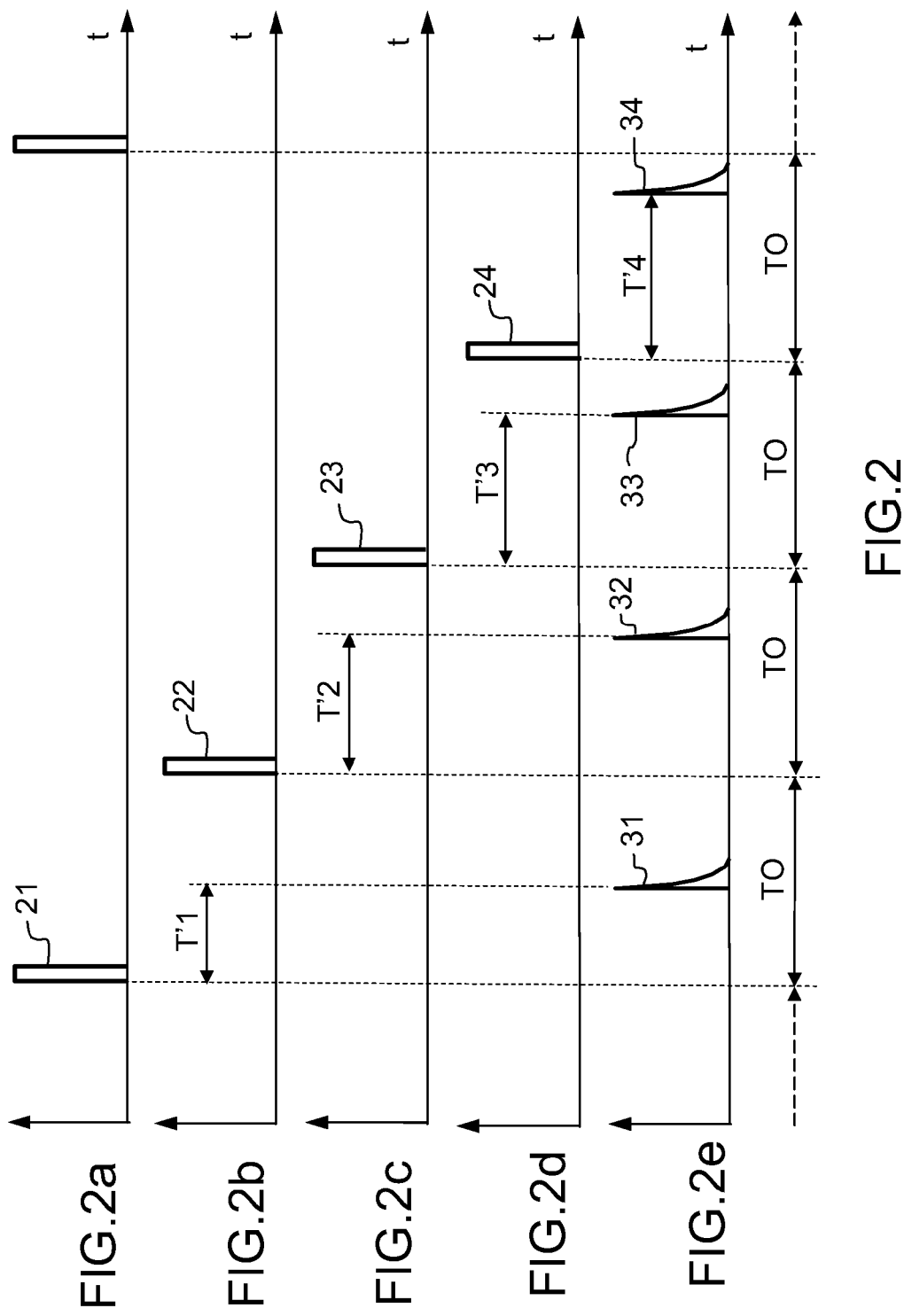

AERODYNAMIC MEASUREMENT PROBE OF AN AIRSTREAM ALONG A WALL

CROSS-REFERENCE TO RELATED APPLICATIONS

This application claims priority of foreign French patent application no. FR 0807392, filed Dec. 23, 2008, the disclosure of which is hereby incorporated by reference in its entirety.

BACKGROUND OF THE INVENTION

The invention relates to an aerodynamic measurement probe of an airstream along a wall. The invention makes it possible notably to determine the attack of an airstream relative to an axial reference tangential to the wall. The invention is particularly useful in the aeronautical field where knowledge of the attack of an airstream surrounding an aircraft is essential to the piloting of the aircraft. The attack relative to a horizontal plane is an important parameter for determining the buoyancy of the aircraft for example in a landing. The attack relative to a vertical plane is also important representing the side slip of the aircraft. To determine these two parameters, attack and side slip, it is possible to locally measure the orientation of the airstream relative to the skin of the aircraft. This involves local attack measurements that are performed at particular points of the aircraft. It is also possible to measure two components of the speed of the airstream at a point of the skin of the aircraft to determine the direction of the airstream.

Numerous sound principles are known and commonly used for speed or flow direction measurements.

A first probe family uses an appendage extending from the skin of the aircraft. This appendage can be fixed. It can include air pressure taps around this appendage or sensors measuring the force exerted by the airstream. This appendage can be mobile in the form of a flag being oriented in the axis of the airstream. The orientation of the flag then gives the attack of the airstream. The first probe family also contains the use of the vortex effect by performing measurements on vortices downstream of a cylindrical body for example, the use of windmills to measure a flow speed in a given direction, the use of a hot wire as anemometer.

The probes of this first family are fragile because of the presence of a body external to the skin of the aircraft. They have to be designed to withstand the abrasion of the airstream and above all of the particles that it can carry. They hamper the aerodynamism of the aircraft by generating a drag. In flights at high altitude, these probes must be de-iced and therefore consume electrical power. The mobile probes must include sealing systems between fixed and mobile parts with the minimum of friction.

A second probe family makes it possible to eliminate any appendage external to the skin of the aircraft. Optical systems organized around lasers exist, but they are currently complex, expensive, bulky. They are still generally used as reference systems.

There is therefore great interest in ultrasound systems among numerous manufacturers. The basic idea is to measure the propagation times of acoustic waves between emitting elements and receiving elements fixed relative to each other, to identify the speeds of a sound wave, as a function of the speed of the sound and the speed of the fluid, in several directions, and finally the direction of flow, for example the attack or side slip in aeronautical applications.

Several types of device are currently known. In document U.S. Pat. No. 4,143,548: an emitter generates an ultrasound wave towards two receivers respectively situated upstream and downstream. The phase relating to the signals received gives an indication on the difference in the speeds in each of the two propagation directions, towards upstream and towards downstream. This device implicitly assumes that the signals are not disturbed so that it is possible to measure the phase between two sinusoidal signals. Moreover, this device imposes constraints on the frequency or wavelength with respect to the distance between emitter and receivers. Finally, the receivers must be identical in terms of transfer function and intrinsic delay.

The documents U.S. Pat. No. 4,112,756 and U.S. Pat. No. 4,890,488 propose similar ideas, with propagation time measurements between emitters and receivers according to different configurations.

The document U.S. Pat. No. 5,585,557 proposes an entirely passive device, in other words without emitter. Turbulences in the flow are received and detected by a first receiver and are propagated downstream, where they are received and detected by other receivers situated at one and the same distance, with delays dependent on the characteristics of the flow in direction and speed. The transit times are calculated from crossed correlation calculations between the signals. An estimate of the direction of flow is that which is defined by the first receiver and the receiver situated downstream presenting the shortest transit time. The accuracy of the system is associated with the number of sensors.

The document U.S. Pat. No. 7,155,969 proposes an enhancement and a simplification of the foregoing, using a smaller number of sensors, and capable of operating through the skin of the airplane. These sensors are not necessarily microphone-type acoustic sensors that require passages in the skin of the airplane to detect the pressure fluctuations, but could also be accelerometers, strain gauges or other sensors mounted on the skin of the airplane for example. The propagation of the pressure fluctuations generated by the turbulence can be replaced by the propagation of a mechanical excitation of the skin of the airplane by means of an appropriate device, active piezoelectric sensor for example. The propagation time measurements are also made from crossed correlation calculations between the signals received by the different sensors.

All these documents describe systems comprising several sensors receiving signals, and deviations between the received signals are used to work back to the propagation times, then to the speeds, and finally to the direction of flow.

The experimental measurement of the travel time between an emitter and a receiver may prove greater than that provided by the theory, to within a relatively constant value. Consequently, the methods of measuring travel times require calibrations of the receivers, each having its own characteristics in terms of response time, bandwidth, etc. These calibrations of the receivers are dependent on the environmental conditions, temperature and pressure in particular. The precise measurement of the attack based on travel time measurements on the ultrasound waves therefore proves fairly complex, because of the characteristics of the different receivers. In the case of totally passive systems, with no active exciter, the acoustic signals received are simply an acoustic noise. A malfunction of one of the receiving sensors is thus difficult to detect, unless, perhaps, the sensor is totally short circuited. Also, the crossed correlation calculations necessitate samplings and storage of low level signals to be able to be carried out.

Finally, all these systems implicitly assume that the signal of acoustic noise type is propagated identically to itself, which is only a first approximation.

SUMMARY OF THE INVENTION

It is therefore a subject of the present invention to remedy these defects by proposing a simpler and more reliable method of measuring propagation times of a wave between two given points.

It is a further subject of the present invention to provide an aerodynamic measurement probe of an airstream along a wall, comprising several emitters that can each emit a sound wave and a receiver sensitive to the different sound waves.

In a preferred embodiment, the probe comprises means of measuring travel times between each of the emitters and the receiver.

It has already been seen that the travel time measurement between an emitter and a receiver was affected by an error. The applicant noticed that this error was mainly due to the receiver and not to the emitter. By using only a single receiver and several emitters, the error on the measurement remains constant and a single calibration remains necessary.

BRIEF DESCRIPTION OF THE DRAWINGS

The invention will be better understood and other advantages will become apparent from reading the detailed description of an embodiment given by way of example, the description being illustrated by the appended drawing in which:

FIGS. 2a to 2e represent, in timing diagram form, signals emitted by the emitters and received by the receiver.

In the interests of clarity, the same elements are given the same references in the different figures.

DETAILED DESCRIPTION OF THE PREFERRED EMBODIMENT

Figure 1:
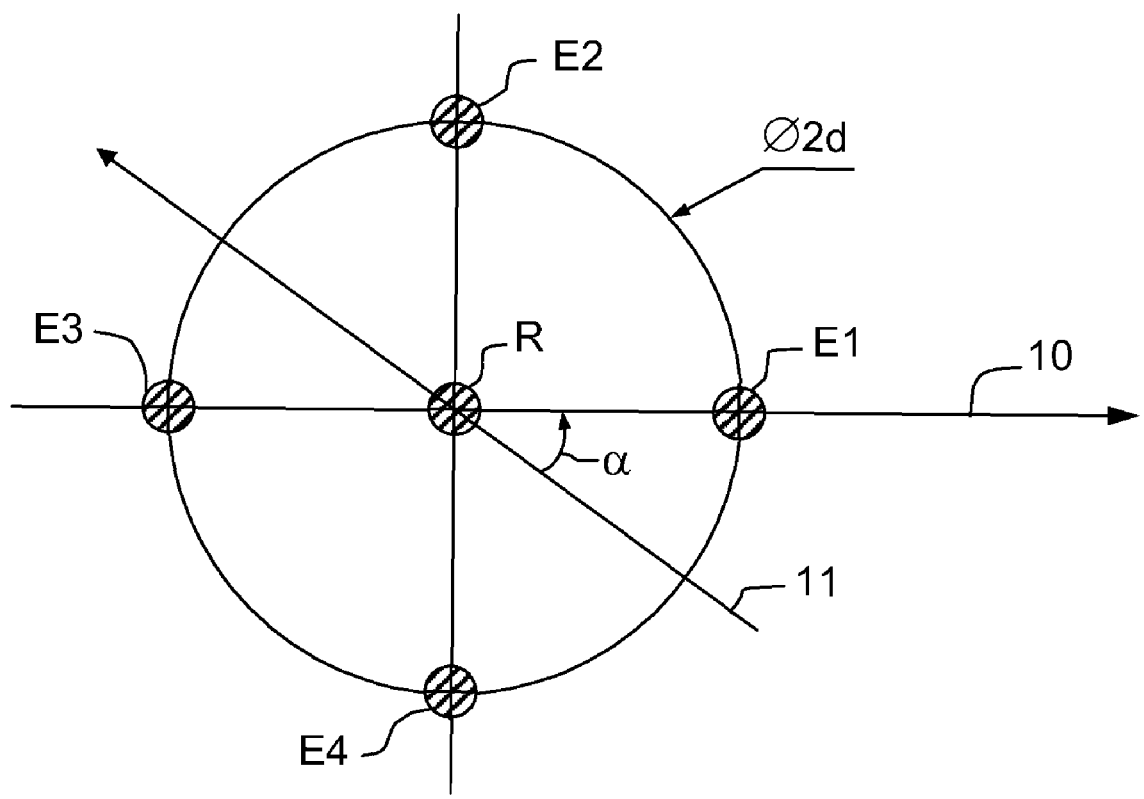
FIG. 1 represents an exemplary distribution of a receiver and several emitters.

FIG. 1 represents a device according to the invention and comprising four emitters E1, E2, E3, E4, that are identical for example, and a single receiver R. It is, of course, possible to implement the invention based on two emitters that can emit a sound wave received by the single receiver R. The sound wave can be ultrasound, for example at a frequency of the order of 40 kHz. The receiver R can be a microphone sensitive to the waves emitted by the emitters or resonant, that is to say sensitive to a particular frequency.

The emitters E1, E2, E3 and E4 are all substantially coplanar in a plane tangential to the surface of a wall, for example the skin of an airplane. The plane tangential to the surface of the skin is that of FIG. 1. The emitters E1, E2, E3 and E4 are advantageously distributed around the receiver R. They can be situated at an equal distance d from the receiver R, and with a pitch of 90° around the receiver R. In other words, the emitters E1 to E4 are all situated on a circle of diameter 2d centred on the receiver R and evenly distributed on this circle. For an attack measurement, the receiver R is positioned substantially in a horizontal plane of symmetry of the airplane, the direction E3-E1 is a longitudinal reference 10, parallel to the horizontal plane of symmetry of the airplane. The direction of an airstream, represented by an axis 11, forms an angle α with this reference, α is the local attack that it is proposed to measure. For a measurement of side slip of the airplane, the receiver R is positioned substantially in a vertical plane of symmetry of the airplane.

If we call c the speed of sound, M the local Mach number and V the local speed of the airstream at the level of the receiver R, the following applies: M=V/c. It is shown that the theoretical travel time T1 of a sound wave emitted by the emitters E1 and received by the receiver R is given by:

$$T1 = \frac{d}{c} \frac{M \cdot \cos\alpha + \sqrt{1 - M^2 \sin^2\alpha}}{1 - M^2} \quad (1)$$

This formula takes account of the fact that the position of the receiver R has varied between the instant at which the sound wave is emitted by the emitter E1 and that at which it is received by the receiver R.

The propagation times T2, T3 and T4, respectively for the emitters E2, E3 and E4, are obtained by similar formulas by respectively replacing α with (α+π/2), (α+π), (α+3 π/2).

The attack α is then obtained by the formula:

$$\text{Tangent } (\alpha) = (T2-T4)/(T3-T1) \quad (2)$$

In practice, the travel times affected by an error are measured. The measured travel times are denoted T'1, T'2, T'3 and T'4 respectively between each of the emitters E1 to E4 and the receiver R. As has been seen previously, the measurement error e remains constant for the receiver R. The following therefore apply:

$$T'1 = T1 + e \quad (3)$$

$$T'2 = T2 + e \quad (4)$$

$$T'3 = T3 + e \quad (5)$$

$$T'4 = T4 + e \quad (6)$$

By subtracting the travel time measurements two by two, it is therefore possible to eliminate this error e even without knowing its exact value. The following therefore apply:

$$T3 - T1 = T'3 - T'1 \quad (7)$$

$$\text{and } T4 - T2 = T'4 - T'2 \quad (8)$$

The formula for calculating the attack α from measured values of the travel times T'1, T'2, T'3 and T'4 therefore becomes:

$$\text{Tangent } (\alpha) = (T'2 - T'4)/(T'3 - T'1) \quad (9)$$

After having determined the local attack of the airstream, it is possible to determine the speed of the airstream expressed as a Mach number. It is also possible to determine the speed of the airstream expressed more conventionally in a unit of the international system or in knots according to a convention generally applied in the aeronautical field based on the temperature of the airstream and its pressure.

Advantageously, it is preferable to successively measure the travel times T'1, T'2, T'3 and T'4, by sequentially activating the emitters, to be able to discriminate them easily. It is, however, possible to imagine simultaneous measurements, if the waveforms emitted by the emitters are sufficiently different to be able to discriminate the travel times T'1, T'2, T'3 and T'4. The use of the signals received by the receiver R is then more complex.

The probe can include means for detecting a phase shift of a signal received by the receiver R relative to a signal emitted by one of the emitters E1, E2, E3 and E4. In this case, the sound wave emitted can be a wave whose frequency is modulated. An example of such a modulation is known from the English literature by the name "Chirp". This is, for example, a sinusoidal signal whose frequency varies linearly in time about a central frequency. The device then comprises means for decoding a frequency modulation of the signal received by the receiver R.

FIGS. 2a to 2e represent, in simplified timing diagram form, an example of signals emitted and received according to the invention. FIGS. 2a to 2d represent the amplitude as a function of the time t of a signal emitted respectively by each of the emitters E1 to E4. FIG. 2e represents the amplitude of the signal received by the receiver R as a function of the same timescale. The four emitters E1 to E4 are successively activated by a signal represented here in the form of a brief pulse of Dirac pulse type, respectively 21 to 24. The benefit of such a pulse lies in the fact that it comprises an edge when it is established.

The time that elapses between two consecutive pulses is advantageously selected such that it is always greater than the greatest of the possible travel times between any one of the emitters E1 to E4 and the receiver R, in order for there to be no ambiguity in the reception by the receiver R. In this case, equal durations T0 have been selected to separate two consecutive pulses. It is, of course, possible to reduce the duration T0 providing means of discriminating the different signals received by the receiver R. To do this, the sound wave emitted by the different emitters E1 to E4 may be a wave whose frequency is modulated. The device then comprises means for decoding a frequency modulation of the signal received by the receiver R.

Pulses 31 to 34 are detected successively by the receiver R. The form of the signal represented is only an approximation of reality. Pulses 31 to 34 respectively correspond to the detection by the receiver R of the pulses 21 to 24 emitted by each of the emitters E1 to E4.

The measured propagation times T'1, T'2, T'3 and T'4 are determined by the deviation between the rising edges of emitted signals 21 to 24 and the respective received signals 31 to 34. The rising edges of the emitted signals 21 to 24 are very well identified by electrical signals exciting the emitters E1 to E4.

The received signal may not exhibit as clear a rising edge because of the propagation of the sound wave in air. To overcome this difficulty, the probe advantageously includes means of processing a signal received by the receiver R, the processing means comprising means for forming an envelope signal of the received signal and means for generating a binary signal whose rising edge appears when the envelope signal exceeds a first threshold and whose falling edge appears when the envelope signal passes below a second threshold, the first threshold being greater than the second threshold. Means for generating the binary signal can comprise a Schmitt trigger.

The rising edges generated in this way are then delayed by their formatting, but by an equal quantity for all the received pulses corresponding to the different emitters E1 to E4. This delay, which is added to the response time itself of the receiver R therefore does not affect the measurement of the propagation time differences, which is the only useful one for measuring the attack.

The invention presents the advantage of easy detection of a failure of any one of the emitters E1 to E4 or of the receiver R. The absence of a pulse 31 to 34 makes it possible to determine that the corresponding emitter has failed. The absence of all the pulses makes it possible to determine either that the receiver R has failed or that all of the probe has failed.

A variant probe embodiment making it possible to determine the attack of the airstream can be implemented based on three emitters and one receiver. The equations to be resolved are more complex, and it is necessary to also calculate the speed of sound c and the speed of flow. This variant nonetheless has the advantage of reducing the number of emitters.

It will be readily seen by one of ordinary skill in the art that embodiments according to the present invention fulfil many of the advantages set forth above. After reading the foregoing specification, one of ordinary skill will be able to affect various changes, substitutions of equivalents and various other aspects of the invention as broadly disclosed herein. It is therefore intended that the protection granted hereon be limited only by the definition contained in the appended claims and equivalents thereof.

What is claimed is:

1. An aerodynamic measurement probe of an airstream along a wall, comprising several emitters that each emit a sound wave and a single receiver sensitive to each of the sound waves.

2. The probe according to claim 1, wherein the emitters are distributed around the receiver.

3. The probe according to claim 1, wherein the emitters are situated at an equal distance from the receiver.

4. The probe according to claim 1, comprising four emitters situated with a pitch of 90° around the receiver.

5. The probe according to claim 4, further comprising:
means of measuring travel times between each of the emitters and the receiver, and
means for determining an attack a of the airstream relative to an axis passing through two of the emitters based on an equation:

$$\text{Tangent } (\alpha) = (T'2 - T'4)/(T'3 - T'1)$$

in which T'1 to T'4 represent the travel times between each of the emitters and the receiver.

6. The probe according to claim 1, further comprising means for generating a sound wave comprising an edge towards each of the emitters.

7. The probe according to claim 1, further comprising means of measuring travel times between each of the emitters and the receiver.

8. The probe according to claim 7, further comprising means for sequentially activating the emitters so as to successively measure the travel times.

9. The probe according to claim 8, further comprising means for generating a sound wave towards each of the emitters and wherein the sound waves are offset in time by at least a maximum travel time between one of the emitters and the receiver.

10. The probe according to claim 1, wherein the receiver is resonant.

11. The probe according to claim 1, further comprising means of processing a signal received by the receiver, the processing means comprising means for forming an envelope signal of the received signal and means for generating a binary signal whose rising edge appears when the envelope signal exceeds a first threshold and whose falling edge appears when the envelope signal passes below a second threshold, and wherein the first threshold is greater than the second threshold.

12. The probe according to claim 1, further comprising means for detecting a phase shift of a signal received by the receiver relative to a signal emitted by one of the emitters.

13. The probe according to claim 10, wherein the sound wave emitted is a wave whose frequency is modulated and in that the device comprises means for decoding a frequency modulation of the signal received by the receiver.

* * * * *